Aug. 29, 1944.   R. L. WOOLLEY   2,357,041
POWER PLANT
Filed Jan. 20, 1942
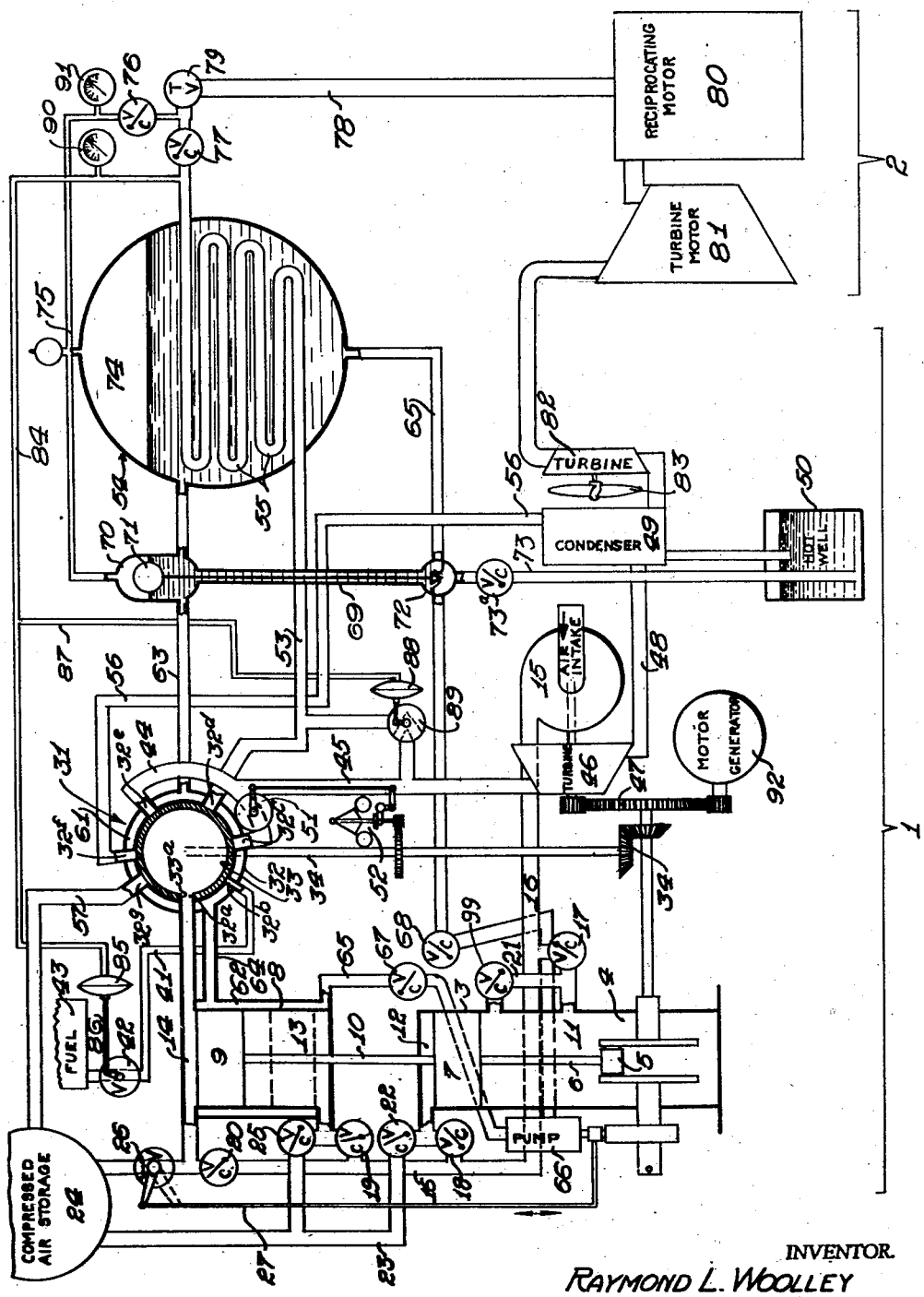
INVENTOR.
RAYMOND L. WOOLLEY
BY Carlos G. Stratton
ATTORNEY Patented Aug. 29, 1944

2,357,041

UNITED STATES PATENT OFFICE 2,357,041

POWER PLANT

Raymond L. Woolley, Los Angeles, Calif.

Application January 20, 1942, Serial No. 427,473

8 Claims. (Cl. 60—49)

My invention relates to power plants, more particularly to power plants utilizing elements of internal combustion engines, and a primary object is to provide a power plant which combines the advantages of a steam engine with those advantages found in internal combustion engines.

A further object is to provide a power plant wherein the products of combustion as well as steam generated by the heat of combustion normally lost through the exhaust pipe and cooling system of the conventional internal combustion engine are utilized to drive a steam engine.

A further object is to provide a power plant having a greater thermal efficiency and a more favorable pound-per-horsepower ratio than has heretofore been possible.

A still further object is to provide a power plant which does not require a muffler to silence the exhaust as the energy is fully utilized.

A still further object is to provide a power plant which is particularly suited for use as the power plant of an airplane, for the reason that the compressor or internal combustion unit of the engine may be carried in the fuselage, and the prime mover or steam engine units may be mounted in the normal wing section without nacelles or other housing means, which increase the parasitic drag.

Another object is to provide a power plant wherein three cylinders can do the work of the usual eight cylinder automobile engine, or a five cylinder engine of this type can do the work of a conventional twelve cylinder airplane motor, and accomplish this with lesser weight, greater economy, and dispense with clutch, gearshifts or similar intermediate control devices.

A still further object is to provide a power plant which may utilize features of an Otto cycle or Diesel cycle engine.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

The drawing is a conventionalized diagrammatical view of my engine, with the various elements altered in relative size and proportion and separated or spread apart to facilitate the illustration.

The power plant comprises generally a compressor unit 1, with the necessary supplementary elements for self operation, and a prime mover unit 2.

The compressor unit 1 includes a lower cylinder 3 connected at its lower end to a crank case 4. Within the crank case 4 is a crankshaft 5 which is joined by a connecting rod 6 to a piston 7. An upper cylinder 8 is mounted above the lower cylinder and is provided with a piston 9 which is joined to the piston 7 by means of a piston rod 10, so that the two pistons 7 and 9 move in unison. The lower cylinder and its piston forms a compression chamber 11 in the crank case 4. A compression chamber 12 is formed above the piston 7, and compression chambers 13 and 14 are formed below and above piston 9.

An air blower or pre-compressor 15 supplies air through a line 16 to intake check valves 17, 18, 19 and 20 connected respectively with the chambers 11, 12, 13 and 14. A bypass tube 21, which has a check valve 99 therein, is positioned so that its ends communicate with the two compression chambers 11 and 12 when the piston 7 is in its lower position. The air compressed in the lower chamber 11 is thus forced into the upper chamber 12. This in turn provides a greater volume of air for the chamber 14, through the intermediary of the tank 24, whereby, on its compression stroke, the piston 9 will compress an increassed volume of air. The piston 7, in combination with the chambers 11 and 12, thus acts as a super-charger for the chamber 14.

Discharge from compression chamber 12 is through a discharge valve 22 into a high pressure line 23 leading to a compressed air storage tank 24. The chamber 13 is also a compression chamber and discharges through a check valve 25 into the high pressure line 23. The compression chamber 14 is connected to the air storage chamber 24 through a mechanically controlled valve 26 which is operated by a link and lever means 27 connected with the crankshaft 5. Thus, once the pressure in the compressed air storage tank has been built up to a desired value, higher than that supplied by the blower, the air in compression chambers 11, 12 and 13 will alternately compress and expand, while the compression chamber 14 serves as a main valve charger, as hereinafter set forth, by reason of its connection with tank 24 through mechanically controlled valve 26. By "main valve charger" is meant that the chamber 14 and piston 9 constitute a charger for the main valve 31, since the piston 9 charges the main valve 31 with compressed air. As piston 9 is on its down stroke, air is being admitted to the cylinder 14 from the air blower 15. Then when the piston 9 has almost reached the bottom of its down stroke, the valve 26 is opened, thus admitting additional air pressure from the tank 24 through the valve 26. The valve 26 is closed in its full line position. When the piston 9 reaches substantially its broken line position, the valve 26 is opened (see broken line position). The cylinders, their pistons and valves, may, of course, be variously arranged or compounded to provide the desired final pressure in the storage chamber, and it is not the intention to limit the invention to the particular arrangement shown.

A main valve, indicated generally by 31, is operatively associated with the compression chamber. The main control valve includes a multiple ported valve housing 32 and a rotatably mounted combustion chamber 33. The valve member is driven by a gear and shaft means 34 from the crank shaft 5.

The combustion chamber 33 is provided with a single port 33a. The valve housing 32 is provided with a series of ports with which the port 33a communicates in sequence. One of these ports in the valve housing, designated 32a, communicates with the chamber 14. The port 33a of the combustion chamber is shown in communication therewith. Assuming rotation of the combustion chamber in a counter-clockwise direction as viewed in the drawing, the port 33a of the valve member communicates in sequence, beginning with port 32a, with fuel port 32b, a turbine port 32c, a generator port 32d, a second turbine port 32e, a condenser port 32f and a scavenger port 32g. The apparatus connected with these ports is described hereinafter.

The fuel port 32b is connected through a pipe line 41 and fuel control valve 42 to a fuel tank 43.

The turbine ports 32c and 32e are connected to a manifold 44, which, in turn, is connected to a pipe 45 connected with the input end of a turbine 46. The turbine 46 is connected by gearing 47 to the crankshaft 5. The blower 15 may be mounted on a shaft common to the turbine and be driven thereby. Exhaust from the turbine 46 is carried by pipe 48 to a condenser 49, the condensate from which drains into a hot well 50.

A control valve 51 is interposed in the manifold 44 between port 32c and the pipe 45 and is operated by a governor 52, driven by the gear and shaft means 34, which operates the main valve 31.

The generator port 32d is connected by a pipe 53 to a generator tank 54. Within the tank the pipe is doubled back and forth to form a heat exchanging grid 55. The function of the generator tank 54 will be described in more detail hereinafter.

The condenser port 32f of the main valve is connected by a pipe line 56 to the condenser 49. The final or scavenger port 32g of the main valve is connected by a pipe line 57 to the compressed air storage tank 24.

The main valve 31 is provided with a water jacket 61, and the upper cylinder 8 likewise is provided with a jacket 62. A pipe line 63 connects the midpart of the generator tank 54 with the water jacket 61. A pipe line 64 connects the two jackets, and a pipe line 65 connects the bottom of the cylinder jacket 62 with the bottom of the generator tank 54. Circulation is maintained through the jackets by a pump 66 and suitable check valves 67 and 68 interposed in the pipe line 65. The pump 66 is driven by the crankshaft 5.

The upper and lower pipe lines 63 and 65 are connected by a cross line or bypass line 69. The bypass line is provided at its upper end with a float chamber 70 containing a float 71. The float 71 controls a float valve 72, provided in the pipe line 65. The pipe line 65 is connected, at a point between valve 72 and check valve 68, to the hot well 50, and this connection, shown at 73, is provided with a check valve 73a.

The generator tank 54 is filled with water the level of which is controlled by the float valve 72, since a falling of the liquid level in the chamber 70 causes the float 71 to descend, thereby closing the valve 72. Above the water level a steam chamber 74 is formed. This is connected with the discharge end of the grid 55 through a pipe 75 and the valve 76. The pipe 75 is also connected with the float chamber 70 so that the liquid levels in the float chamber and generator tank 54 are equal.

The discharge end of the grid 55 is provided with a valve 77, before intersection of the pipe 75. Beyond this intersection the pipe 75 and grid 55 form a pressure line 78 which is controlled by a throttle valve 79. The pressure line 78 leads to one or more reciprocating motors 80, such as reciprocating steam engines, and to steam turbine motors 81 and 82. The reciprocating motor 80 and turbine motors 81 and 82 may be in series, either one ahead of the other, as desired.

Discharge from the motor 82, which drives a fan 83 for the condenser 49, goes into the condenser 49.

A control line 84 extends from the outlet end of the grid 55 to a diaphragm control 85 which is connected by a link means 86 to the fuel control valve 42. A similar control line 87 extends to a diaphragm control 88 which controls a valve 89 for bypassing high pressure gasses from grid 55 into the turbine supply line 45.

Pressure gauges 90 and 91 are suitably connected with the grid 55 and the steam chamber 74, and suitable safety valves, not shown, are provided.

Operation of my power plant is as follows:

The compressor unit is started by a hand crank or by a motor generator 92 connected with the crank shaft 5. The four chambers 11, 12, 13 and 14, with the aid of the precompressor 15, compress air into the compressed air storage 24. The chamber 14 may be so constructed, and its connection with the main valve 31 be such that on the first stroke the air in chamber 14 is at sufficiently high pressure that the fuel entering port 32b is ignited in the combustion chamber 33. Upon ignition, some of the combustion gases are delivered through port 32c to the turbine 46, which in turn drives the compressor. Continued rotation of the main valve connects the combustion chamber with the pipe 53 and grid 55.

Continued rotation uncovers port 32e which allows the combustion gases, now reduced in pressure, to pass to turbine 46. Any gases not discharged through port 32e are exhausted to the condenser through port 32f. Port 32g is preferably so arranged that it is partially opened before port 32f is closed so that compressed air from the storage tank 24 may scavenge any residue gases driving them through port 32f.

The heat generated by combustion of the fuel is transferred in part to the water contained in the jackets 61 and 62, and the heated water returned to the generator tank 54. Also the hot combustion gases in pipe 53 and grid 55 give up a substantial amount of heat to the surrounding water.

As a consequence a high pressure gas comprising the products of combustion is contained in the grid 55, and high pressure steam is generated in the steam chamber 74. This resulting gas and steam are delivered by the throttle valve 79 to the motors 80, 81 and 82.

As the pressure builds up in the grid 55, the pressure controls 85 and 88 diminish respectively the fuel supplied to the main valve and its combustion chamber, and the turbine 46 these controls being similarly affected by pressure in the grid 55 and being coordinated by adjustment of their diaphragms. Control of the turbine 46 is also affected by the governor 52 and its valve 51 and this latter control is merely a speed control which is automatic and independent of the diaphragm controls 85 and 88.

The governor 52 controls the valve 51. When the motor is starting, the valve 51 is open, permitting products of combustion to flow from the port 32c through pipe 45 to the turbine 46, which keeps the crankshaft 5 rotating. When the motor has attained a relatively high speed, the governor closes the valve 51, so that the products of combustion must flow through the port 32e, through the manifold 44 and the pipe 45. When the valve 51 is closed, however, most of the products of combustion flow out through the port 32d and only a minimum amount of the products of combustion flows through the port 32e to the turbine 46 (just enough to maintain rotation of the crankshaft 5, if it is rotating, but not enough by itself to start rotation thereof).

When the pressure in the grid 55 falls below a predetermined amount, the control 88 opens the valve 89, permitting the products of combustion from the grid to flow past valve 89 to the turbine 46, thus starting the crankshaft 5 with the aid of the products of combustion from the port 32e, if the turbine has stopped.

Reduction of pressure in the grid also causes the control 85 to open the fuel valve 42, thus admitting fuel to the motor.

Upon building up sufficient pressure in the grid, the controls 88 and 85 respectively close the valves 89 and 42, thus cutting off the flow of products of combustion from the grid to the turbine 46 and cutting off further fuel supply.

It is to be understood that the control 88 will re-close the valve 89 upon the initial rise in pressure within the grid 55. The control 85, however, does not re-close the valve 42 until the desired pressure within the grid 55 is arrived at. The valve 42 is only closed long enough to stop the motor, and the valve 89 is only open long enough to re-start the motor. The broken lines in the circles indicating the valves 42, 51 and 89 are to suggest the positions of the passages, with respect to their connecting conduits, when the motor is operating. The upper part of the valve 26 has been broken away to show the vertical position of the valve passage when the lever on the valve 26 is in its full line position.

For example, the products of combustion may be allowed to build up to a pressure of around 525 pounds per square inch, wherein the pressure control 85 begins to shut off the supply of fuel, shutting it off completely when the pressure reaches 550 pounds. When the pressure recedes to 500 pounds, the fuel valve opens and the turbine is started up, initially of course, by the pressure in the grid 55.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A power plant comprising a multiple stage compressor; a storage tank for air compressed by said compressor; a combustion device including a housing having a series of ports and means rotatable therein defining a combustion chamber, said means having a port communicating in sequence with said series of ports; a source of fuel connected with one of said ports; said compressor and storage tank connected with others of said ports whereby the fuel may be caused to burn in said chamber and generate products of combustion at high temperature and pressure; a steam generator including a tank and a coil therein connected to one of said housing ports, whereby fluid in the tank is heated by and in turn cools said products of combustion; an engine, connections combining the resulting steam and cooled products of combustion for driving said engine; and a drive means common to said compressor and the rotatable means of said combustion device, said driving means having an intake port communicating with certain ports of said combustion device and driven by a portion of the products of combustion generated in said combustion device.

2. A power plant comprising: a multiple stage compressor; a storage tank for air compressed by said compressor; a combustion device including a series of ports and means rotatable therein defining a combustion chamber, said means having a port communicating in sequence with said series of ports; a source of fuel connected with one of said ports; said compressor and storage tank connected with others of said ports whereby the fuel may be caused to burn in said chamber and generate products of combustion at high temperature and pressure; a steam generator including a heat exchanger tank containing water and having therein heat exchanger tubes from said combustion device, a water jacket around said combustion device and said compressor and connected with said heat exchanger tank, said steam generator adapted to receive heat from the products of combustion and from the air compressed by said compressor and in turn partially cool said products of combustion; and an engine driven by the resulting steam and cooled products of combustion.

3. A power plant comprising: a multiple stage compressor; a storage tank for air compressed by said compressor; a combustion device including a housing, having a series of ports and means rotatable therein, defining a combustion chamber, said means having a port communicating in sequence with said series of ports; a source of fuel connected with one of said ports; said compressor and storage tank connected with others of said ports whereby the fuel may be caused to burn in said chamber and generate products of combustion at high temperature and pressure; a gas generator including a heat exchanger containing a coolant in a liquid phase and having therein heat exchanger tubes connected with said combustion device, a coolant jacket around said combustion device and said compressor and connected with said heat exchanger tank, said coolant adapted to be heated in said jacket and in said heat exchanger until at least partially in a gaseous phase; and an engine driven jointly by the resulting coolant in the gaseous phase and the partially cooled products of combustion.

4. A power plant comprising: a multiple stage compressor; a storage tank for air compressed by said compressor; a combustion device including a housing, having a series of ports and means rotatable therein, defining a combustion chamber, said means having a port communicating in sequence with said series of ports; a source of fuel connected with one of said ports; said compressor and storage tank connected with others of said ports whereby the fuel may be caused to burn in said chamber and generate products of combustion at high temperature and pressure; a gas generator including a heat exchanger containing a coolant in a liquid phase and having therein heat exchanger tubes connected with said combustion device, a coolant jacket around said combustion device and said compressor and connected with said heat exchanger tank; said coolant adapted to be heated in said jacket and in said heat exchanger until at least partially in a gaseous phase; and an engine driven jointly by the resulting coolant in the gaseous phase and the partially cooled products of combustion; a drive means common to said compressor and the rotatable means of said combustion device, said driving means having an intake port communicating with certain ports of said combustion device and driven by a portion of the products of combustion generated in said combustion device.

5. A power plant comprising a multiple stage compressor; a storage tank for air compressed by said compressor; a combustion device including a housing having a series of ports and means rotatable therein defining a combustion chamber, said means having a port communicating in sequence with said series of ports; a source of fuel connected with one of said ports; said compressor and storage tank connected with others of said ports whereby the fuel may be caused to burn in said chamber and generate products of combustion at high temperature and pressure; a steam generator heated by and in turn cooling said products of combustion; and an engine driven by the resulting steam and cooled products of combustion; a drive means common to said compressor and the rotatable means of said combustion device, said driving means having an intake port communicating with certain ports of said combustion device and driven by a portion of the products of combustion generated in said combustion device; a pressure responsive means associated with said heat exchanger and connected with said fuel supply to regulate the quantity thereof introduced into said combustion chamber.

6. A power plant comprising a multiple stage compressor; a storage tank for air compressed by said compressor; a combustion device including a housing having a series of ports and means rotatable therein defining a combustion chamber, said means having a port communicating in sequence with said series of ports; a source of fuel connected with one of said ports; said compressor and storage tank connected with others of said ports whereby the fuel may be caused to burn in said chamber and generate products of combustion at high temperature and pressure; a steam generator heated by and in turn cooling said products of combustion; and an engine driven by the resulting steam and cooled products of combustion; a drive means common to said compressor and the rotatable means of said combustion device, said driving means having an intake port communicating with certain ports of said combustion device and driven by a portion of the products of combustion generated in said combustion device; a control means including pressure responsive means associated with said heat exchanger and a valve means connected between said driving means and said combustion device and operated by said pressure responsive means to control the output from said combustion device to said heat exchanger.

7. A power plant comprising: a multiple stage compressor; a storage tank for air compressed by said compressor; a combustion device including a housing, having a series of ports and means rotatable therein, defining a combustion chamber, said means having a port communicating in sequence with said series of ports; a source of fuel connected with one of said ports; said compressor and storage tank connected with others of said ports whereby the fuel may be caused to burn in said chamber and generate products of combustion at high temperature and pressure; a gas generator including a heating exchanger containing a coolant in a liquid phase and having therein heat exchanger tubes connected with said combustion device, a coolant jacket around said combustion device and said compressor and connected with said heat exchanger tank, said coolant adapted to be heated in said jacket and in said heat exchanger until at least partially in a gaseous phase; and an engine driven jointly by the resulting coolant in the gaseous phase and the partially cooled products of combustion; a drive means common to said compressor and the rotatable means of said combustion device, said driving means having an intake port communicating with certain ports of said combustion device and driven by a portion of the products of combustion generated in said combustion device; pressure responsive means associated with said heat exchanger and connected with said fuel supply to regulate the quantity thereof introduced into said combustion chamber.

8. A power plant comprising: a multiple stage compressor; a storage tank for air compressed by said compressor; a combustion device including a housing, having a series of ports and means rotatable therein, defining a combustion chamber, said means having a port communicating in sequence with said series of ports; a source of fuel connected with one of said ports; said compressor and storage tank connected with others of said ports, whereby the fuel may be caused to burn in said chamber and generate products of combustion at high temperature and pressure; a gas generator, including a heat exchanger, containing a coolant in a liquid phase and having therein heat exchanger tubes connected with said combustion device, a coolant jacket around said combustion device and said compressor and connected with said heat exchanger tank, said coolant adapted to be heated in said jacket and in said heat exchanger until at least partially in a gaseous phase; and an engine driven jointly by the resulting coolant in the gaseous phase and the partially cooled products of combustion; a drive means common to said compressor and the rotatable means of said combustion device, said driving means having an intake port communicating with certain ports of said combustion device and driven by a portion of the products of combustion generated in said combustion device; control means including pressure responsive means associated with said heat exchanger and a valve means connected between said driving means and said combustion device and operated by said pressure responsive means to control the output from said combustion device to said heat exchanger.

RAYMOND L. WOOLLEY.